United States Patent
Kadous et al.

(10) Patent No.: US 10,678,776 B1
(45) Date of Patent: *Jun. 9, 2020

(54) AUTOMATED IDENTIFICATION OF ANOMALOUS MAP DATA

(71) Applicant: Google Inc., Mountain View, CA (US)

(72) Inventors: Mohammed Waleed Kadous, Sunnyvale, CA (US); Joakim Kristian Olle Arfvidsson, Mountain View, CA (US); Anup Mantri, Mountain View, CA (US)

(73) Assignee: Google LLC, Mountain View, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/438,645

(22) Filed: Feb. 21, 2017

Related U.S. Application Data

(63) Continuation of application No. 13/253,942, filed on Oct. 5, 2011, now Pat. No. 9,696,166.

(60) Provisional application No. 61/390,519, filed on Oct. 6, 2010.

(51) Int. Cl.
*G01C 21/32* (2006.01)
*G06F 16/29* (2019.01)
*G06F 16/23* (2019.01)

(52) U.S. Cl.
CPC ......... *G06F 16/2365* (2019.01); *G01C 21/32* (2013.01); *G06F 16/29* (2019.01)

(58) Field of Classification Search
CPC ...... G06F 16/2365; G06F 16/29; G01C 21/32
See application file for complete search history.

(56) References Cited

U.S. PATENT DOCUMENTS

| | | | | |
|---|---|---|---|---|
| 6,047,234 A | * | 4/2000 | Cherveny | G01C 21/26 340/988 |
| 6,385,539 B1 | * | 5/2002 | Wilson | G01C 21/30 340/905 |
| 6,516,267 B1 | * | 2/2003 | Cherveny | G01C 21/26 123/399 |
| 6,718,258 B1 | * | 4/2004 | Barton | G01C 21/32 340/991 |
| 6,853,905 B2 | * | 2/2005 | Barton | G08G 1/0969 340/991 |
| 6,853,913 B2 | * | 2/2005 | Cherveny | G01C 21/26 340/988 |
| 6,873,998 B1 | * | 3/2005 | Dorum | G06F 17/30241 342/64 |
| 7,406,482 B2 | * | 7/2008 | Dorum | G06F 17/30241 701/450 |

(Continued)

*Primary Examiner* — Peter D Nolan
(74) *Attorney, Agent, or Firm* — Dority & Manning, P.A.

(57) ABSTRACT

An autocheck module of a map system is configured to automatically identify anomalous conditions within map data that may indicate an error within the data. The identification of the anomalous conditions is accomplished by application of different autocheck types to the map data, each autocheck type representing a class of anomalies and being triggered if particular map data exhibits the anomalous condition associated with the autocheck type. In one embodiment, for at least some of the portions of map data that trigger an autocheck type, an issue entry is created in an issue database, the issue entry referencing the autocheck type that was triggered, the map data that triggered it, and any associated data of relevance for the particular autocheck type in question.

25 Claims, 7 Drawing Sheets

(56) References Cited

U.S. PATENT DOCUMENTS

| | | | |
|---|---|---|---|
| 8,078,572 B2* | 12/2011 | Dorum | G06F 17/30241 |
| | | | 701/450 |
| 8,467,810 B2* | 6/2013 | Kaplan | G01C 21/32 |
| | | | 455/404.1 |
| 8,782,055 B2* | 7/2014 | Johnson | G01C 21/32 |
| | | | 701/409 |
| 8,880,568 B2* | 11/2014 | Perczynski | G01C 21/32 |
| | | | 707/722 |
| 8,910,010 B2* | 12/2014 | Cooke | G01C 21/32 |
| | | | 701/117 |
| 9,043,138 B2* | 5/2015 | Ginsberg | G01C 21/32 |
| | | | 701/400 |
| 2003/0125871 A1* | 7/2003 | Cherveny | G01C 21/26 |
| | | | 701/409 |
| 2004/0093392 A1* | 5/2004 | Nagamatsu | H04L 67/18 |
| | | | 709/218 |
| 2004/0172418 A1* | 9/2004 | Dorum | G06F 17/30241 |
| 2004/0186661 A1* | 9/2004 | Barton | G01C 21/32 |
| | | | 701/532 |
| 2005/0149259 A1* | 7/2005 | Cherveny | G01C 21/26 |
| | | | 701/532 |
| 2005/0283699 A1* | 12/2005 | Nomura | G01C 21/32 |
| | | | 714/746 |
| 2008/0082225 A1* | 4/2008 | Barrett | G01C 21/32 |
| | | | 701/26 |
| 2008/0228826 A1* | 9/2008 | Dorum | G06F 17/30241 |
| 2008/0240505 A1* | 10/2008 | Nakamura | G01C 21/26 |
| | | | 382/103 |
| 2009/0070031 A1* | 3/2009 | Ginsberg | G01C 21/32 |
| | | | 701/532 |
| 2010/0070160 A1* | 3/2010 | Haatainen | G01C 21/32 |
| | | | 701/533 |
| 2010/0153348 A1* | 6/2010 | Perczynski | G01C 21/32 |
| | | | 707/692 |
| 2012/0158746 A1* | 6/2012 | Johnson | G01C 21/32 |
| | | | 707/748 |
| 2012/0179358 A1* | 7/2012 | Chang | G01C 21/32 |
| | | | 701/119 |
| 2012/0254707 A1* | 10/2012 | Cooke | G01C 21/32 |
| | | | 714/799 |
| 2012/0316780 A1* | 12/2012 | Huth | G01C 21/36 |
| | | | 701/450 |
| 2015/0058300 A1* | 2/2015 | Perczynski | G01C 21/32 |
| | | | 707/690 |

* cited by examiner

AUTOMATED IDENTIFICATION OF ANOMALOUS MAP DATA

CROSS REFERENCE TO RELATED APPLICATIONS

This application is a continuation of U.S. patent application Ser. No. 13/253,942, filed on Oct. 5, 2011, which claims the benefit of Provisional Application No. 61/390,519, filed on Oct. 6, 2010, which is hereby incorporated herein by reference.

BACKGROUND

1. Field of Art

The present invention generally relates to the field of digital information processing, and more specifically, to identifying and responding to anomalous conditions within digital map data.

2. Background of the Invention

Map databases store map data used to provide users with maps of particular locations, of routes between two or more locations of interest, and the like. Users rely on the map data to be accurate, and inaccurate data can lead to a host of undesirable results, such as the recommendation of an inefficient route, or worse, of a dangerous or impossible route, such as a route directing the wrong way on a one-way street, or a route that traverses a non-existent road. Unfortunately most map databases do include some amount of inaccurate data.

Given the serious user dissatisfaction caused by inaccurate data, identifying and correcting the inaccurate data is highly beneficial. However, manually examining a large volume of data within a map database is tedious and error-prone for human operators. Thus, inaccurate data tends to be very expensive to identify and correct in terms of both time and money, and in many cases is never corrected at all.

SUMMARY

An autocheck module of a map system is configured to automatically identify anomalous conditions within map data that may indicate an error within the data. The identification of the anomalous conditions is accomplished by application of different autocheck types to the map data, each autocheck type representing a class of anomalies and being triggered if particular map data exhibits the anomalous condition associated with the autocheck type.

In one embodiment, for at least some of the portions of map data that trigger an autocheck type, an issue entry is created in an issue database, the issue entry referencing the autocheck type that was triggered, the map data that triggered it, and any associated data of relevance for the particular autocheck type in question. Human operators of editing clients investigate the anomalies represented by the issue entries and provide a resolution status for the anomalies, such as that the associated map data was in fact correct, or that the data was incorrect but was corrected by the operator. After receiving the resolution status, the associated autocheck type may then be reevaluated and an action taken based on both the received resolution status and whether the autocheck type triggers again when reevaluated.

In one embodiment, autocheck types triggering on different portions of the map data are nonetheless considered to represent the same anomalous situation if the autocheck types are the same and their associated locations are within some threshold distance of each other, such as 10 meters.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

System Environment

Figure 1:
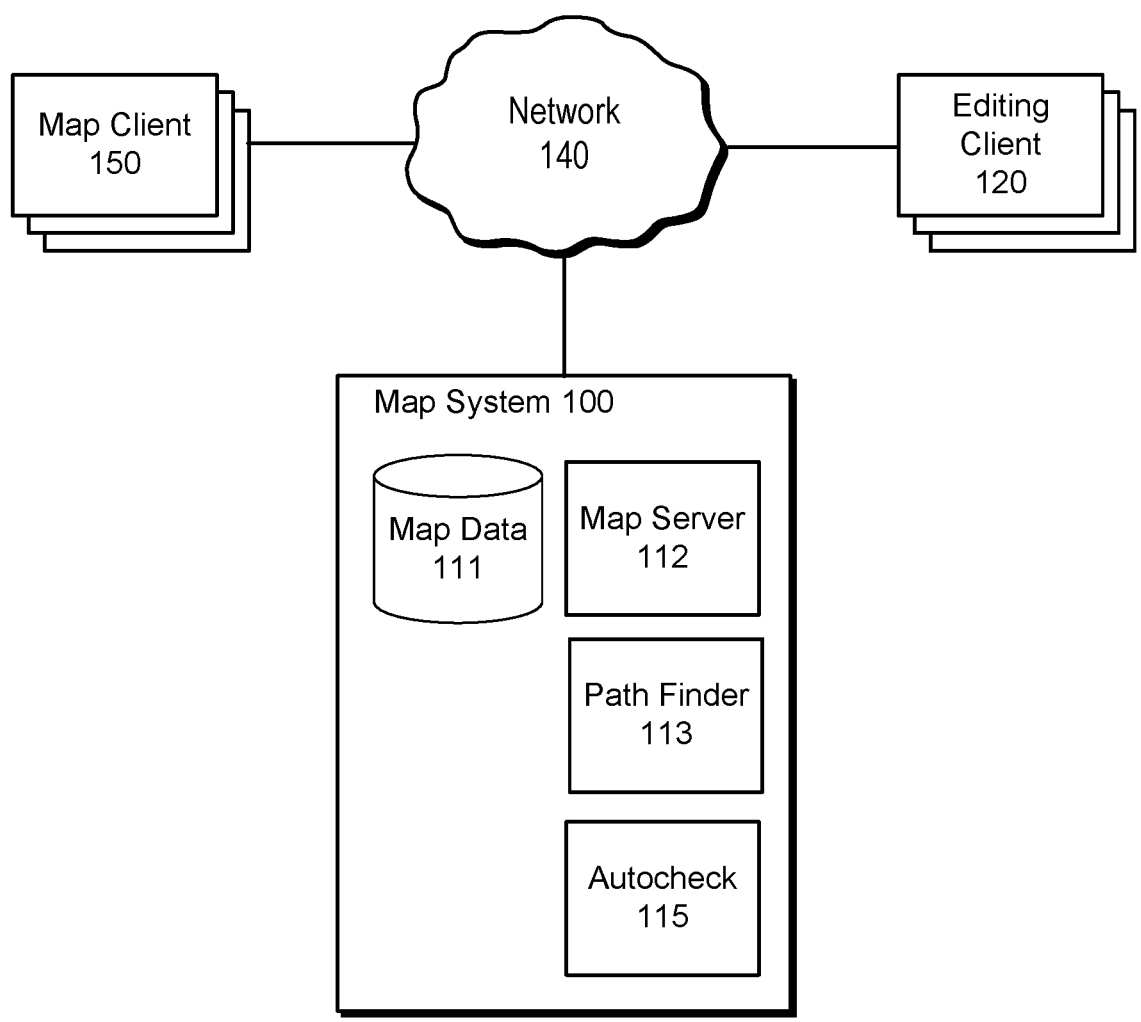
FIG. 1 is a block diagram of a computing environment, according to one embodiment of the present invention.

FIG. 1 is a block diagram of a computing environment, according to one embodiment. A map system 100 provides data 111 to a map client 150 via a network 140. Editing clients 120 may be used to view, verify, and edit the map data 111 in order to enhance its accuracy.

A map client 150 is a computing device executing software that requests map data from the map system 100 and performs actions based on that map data, such as presenting the map data in graphical form to a user of the computing device. For example, a conventional desktop computer system executing the web-based GOOGLE MAPS application is one example of a map client 150. The map client 150 may receive the map data in raw form and graphically render the data itself, or it may receive the data already in a rendered, displayable format, such as part of a map web page.

The map system 100 stores map data 111 and provides the map data and various related services to the map clients 150.

The map data 111 of the map system 100 comprises data describing physical locations and the relationships between them, as well as their respective properties. The map data 111 may be specific to a particular geographic area, such as a city, state, country, or continent. In one embodiment, the map data 111 comprises a number of road elements, each element being either a road segment or an intersection that joins road segments. A road segment represents a traversable path from one location to another. In one embodiment, a road segment is represented by one or more line segments (i.e., a polyline). In other embodiments, a road segment is represented by exactly one line segment, or may additionally be represented by a spline or other curve. An intersection represents a location at which one can transition from one road segment to a different road segment. For example, where two roads cross and it is possible (e.g., both physically possible and legally permissible) to make a turn from one road to the other, there is an intersection for the two roads; if, however, no such transition from one road to another were possible (or legally permissible), such as in the case of a highway overpass crossing over another road, there is no intersection. Road segments are said to be adjacent to two other road elements, in that a road segment typically terminates, at each end, either in another road segment or in an intersection. However, in some cases a given road segment may have fewer than two adjacent road elements, such as a road segment at the end of a cul de sac. A path between any two given locations is thus composed of a (potentially large) number of road segments and intersections, ordered in a sequence from the source location to the destination location.

The road segments may have a number of associated properties, such as:
- the one or more names of a road of which the road segment is a part (e.g. "Main Street" or "I-80");
- the segment location (e.g., geographic coordinates corresponding to the midpoint of the segment, or a pair of geographic coordinates corresponding to the segment endpoints);
- the segment length;
- the road type (e.g., a paved road, unpaved road, railroad, bicycle path, or ferry line);
- the road usage (e.g., ramp, roundabout, or parking lot);
- the priority of the road segment (e.g., an ordered set of values, such as—from lowest to highest priority—"nontraffic", "terminal", "local", "minor arterial", "major arterial", "secondary highway", "primary highway", "limited access", and "controlled access" (also referred to as a freeway), with certain contiguous subsets constituting priority ranges, such "nontraffic", "terminal", and "local" representing a local roads range, and "minor arterial", "major arterial", "secondary highway", "primary highway", "limited access", and "controlled access" representing an arterial roads range);
- the speed limit;
- the directionality of the road segment (e.g., whether one-way or two-way, and if one-way, in which direction);
- whether the road segment is a ramp onto a high-priority road segment, such as a freeway;
- whether the road segment has a toll fee associated with it;
- a grade level associated with the road segment and roughly corresponding to an altitude (e.g., an overpass, a tunnel, or a road at ground level);
- any turn restrictions associated with that segment (e.g., no right turns at a given intersection);
- sign information associated with the road segment and having a direction (e.g., a sign "To Main Street" for a freeway segment and associated with one of directions on the segment);
- associated observed data, such as global positioning system (GPS) readings obtained from vehicles travelling across that road segment;
- whether the road is a split road (i.e., corresponds to one of the two directions on a physical two-way road);
- a path radius value specifying a scalar value (e.g., a real number) providing a measure of a maximum trip length through that segment (e.g., a freeway segment with a path radius of 29.5, indicating that the average trip length that traverses that freeway segment is 29.5 kilometers); and
- a range of addresses associated with the segment (such as "100-250" traveling in one direction, and "101-251" traveling in the other direction).

The exact list of properties and their different possible values can vary in different embodiments. For example, the priority property may have different possible priorities than those listed above.

The intersections store a list of the respective road segments that they join; for example, an intersection of two road segments would store a road segment list comprising those two road segments. Intersections may also have a number of associated properties, such as a location, or associated turn restrictions. In one embodiment, the map data 111 also describe other features, such as bodies of water, mountains, or other points of interest.

In one embodiment, the map data 111 are derived from one or more sources, such as the Topologically Integrated Geographic Encoding and Referencing (TIGER) system available from the United States Census Bureau, the United States Geological Survey, and/or the United States Postal Service. In one embodiment, the map data 111 from these sources is not used purely as-is, but rather is edited or otherwise modified, with or without human input. For example, in one embodiment a number of human operators edit the map data 111 via software running on one of the editing clients 120. The software enables the operators to perform actions such as adding or correcting road names, building address ranges, identifying signs, and the like. Additionally and/or alternatively, engineers, database administrators, or other technical specialists may write programs to automatically analyze the map data 111 and make global changes to it, to augment the map data 111 with data from additional data sources, and the like.

The map system 100 further comprises a map server 112, which responds to requests for map data from the map clients 150. For example, the map server 112 could receive a request for a map of a particular location (e.g., a particular address, a city, a landmark, etc.) from a map application on a map client 150, and accordingly provide map data associated with that location, such as all map data bounded by the current viewing area of the map application. Similarly, the map server could receive a request for a map of a route between two locations, and accordingly provide map data associated with that route.

The map system 100 further comprises a path finder module 113 that calculates an efficient route between two or more given locations. The path finder module 113 may use any of a number of different algorithms for determining efficient routes, such as Dijkstra's algorithm or the A* algorithm.

The map system further comprises an autocheck module 115. The autocheck module 115 implements a set of heuristics that are automatically applied to the map data 111 to identify any anomalies within the map data, such as unreachable destinations, several unusually sharp turns located near each other, and the like. The heuristics for identifying a particular type of anomaly are hereinafter referred to as an "autocheck type," signifying that they perform an automated check for a particular type of anomalous condition within the map data 111. In one embodiment, the autocheck module 115 further includes functionality for investigating the anomalies and resolving any associated inconsistencies in the map data 111.

The editing clients 120 execute software enabling their users to examine and edit the map data 111. For example, as noted such software might enable human operators to perform actions such as adding or correcting road names, building address ranges, identifying signs, and the like. In some embodiments, the software on the editing clients 120 comprises software to investigate and resolve any anomalies detected by the autocheck module 115 of the map system 100. For example, such software might access some list of issues corresponding to a number of detected anomalies, and include functionality for focusing on the particular map data associated with each of the anomalies, to alter that data if desired, and to mark the associated anomaly as either correct data (i.e., a false positive) or as incorrect data that has been corrected.

As a more specific example, a particular road segment might be listed as being part of a two-way road, yet all associated GPS readings might point in one single direction. The autocheck module 115 might consequently flag this road segment as possibly being part of a one-way road, rather than a two-way road, as currently listed. Software on an editing client 120 could allow a human operator to view satellite images associated with the location of that road segment and/or other nearby road segments, e.g. to locate an image of a street sign stating whether the road segment is indeed one way. If the operator finds an image of a one-way street sign, then the operator can use the software to change the road segment directionality to indicate that it is one-way and to mark the detected anomaly as incorrect data that has now been corrected. If the operator fails to find the image of a one-way street sign, or finds other evidence that the street is two-way (e.g., satellite imagery showing vehicles moving in both directions, or a two-way road divider in the middle of the road, then the operator can use the software to mark the anomaly as representing data that is in fact correct.

The network 140 represents the communication pathways between the map clients 150, the editing clients 120, and the map system 100. In one embodiment, the network 140 uses standard Internet communications technologies and/or protocols. Thus, the network 140 can include links using technologies such as Ethernet, 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

FIG. 1 depicts multiple map clients 150 and editing clients 120, and one map system 100, although there could be any numbers of each. For example, the map data 111 might be distributed over a number of physical map systems 100, each storing all the map data or only a portion thereof.

Figure 2:
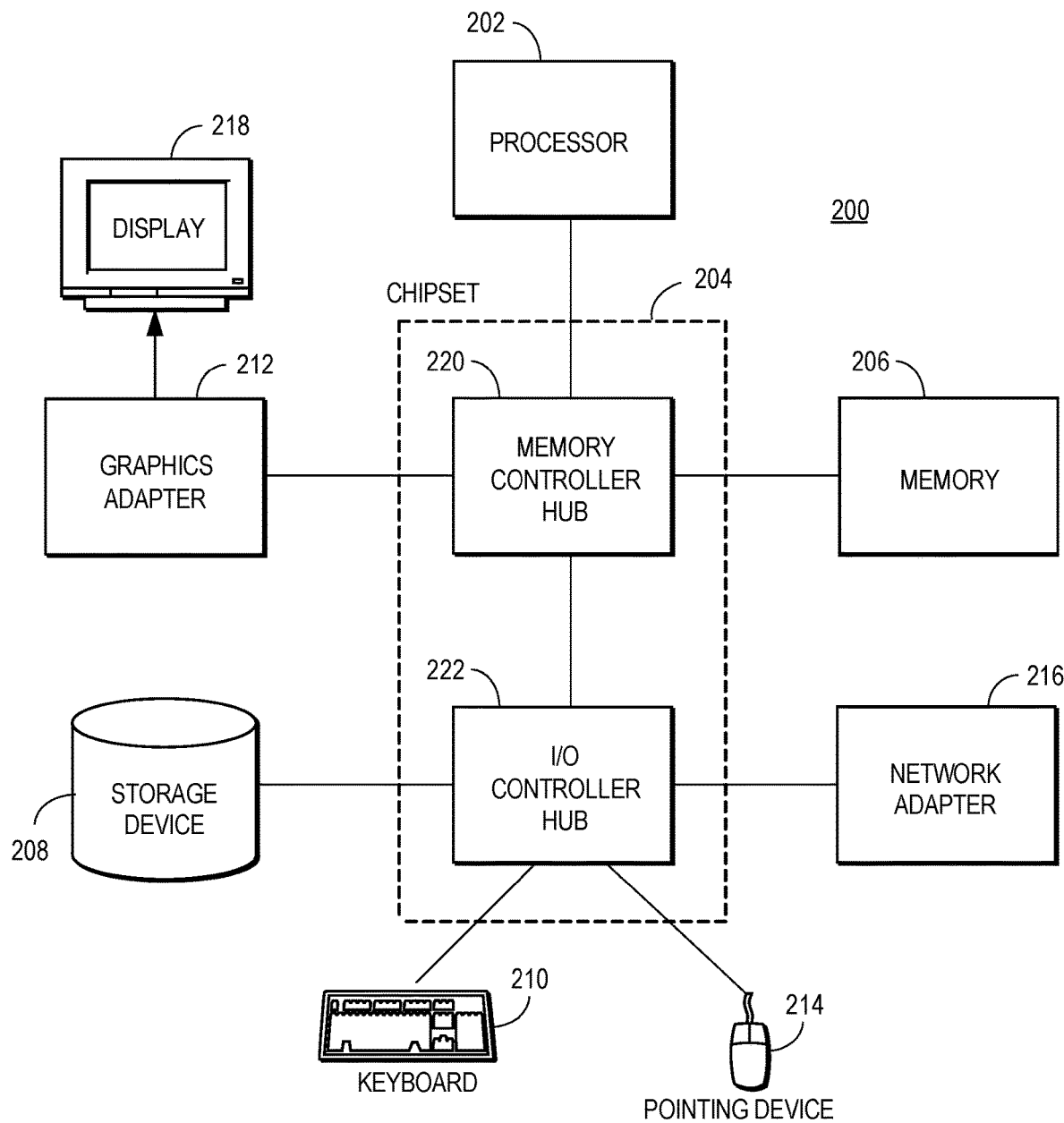
FIG. 2 is a high-level block diagram illustrating physical components of a computer, according to one embodiment.

FIG. 2 is a high-level block diagram illustrating physical components of a computer 200 used as part of the map system 100 and/or the map clients 150 and editing clients 120 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. In one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
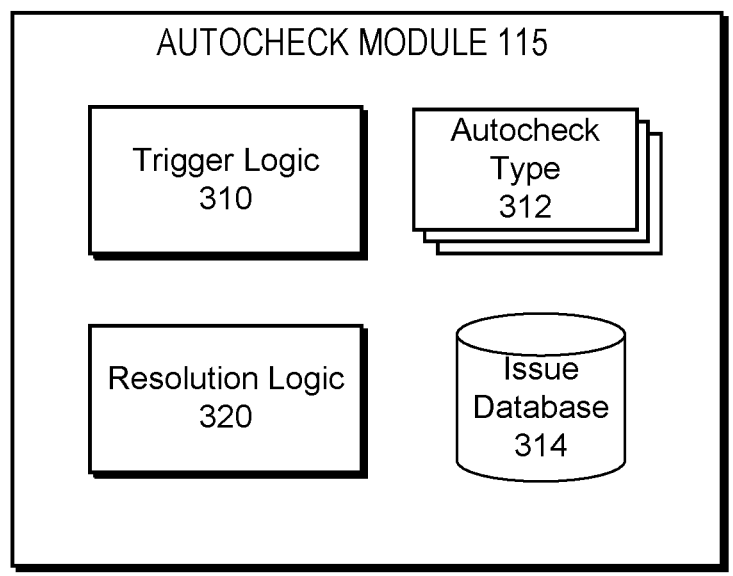
FIG. 3 is a block diagram illustrating a more detailed view of the autocheck module of FIG. 1, according to one embodiment.

FIG. 3 is a block diagram illustrating a more detailed view of the autocheck module 115 of FIG. 1, according to one embodiment. The autocheck module 115 comprises a number of autocheck types 312, each type representing one category of anomalous conditions that might occur within the map data 111. Trigger logic 310 identifies portions of the map data for which the various autocheck types 312 are triggered, creating a corresponding issue entry within an issue database 314. Resolution logic 320 automatically or semi-automatically resolves the various issues in the issue database 314. These different components of the autocheck module 115 are now described in more detail.

Each of the autocheck types 312 represents a category of anomalous conditions that might occur within the map data 111. For example, in one embodiment the autocheck types 312 include a "mislabeled two-way road" type that (as described above) corresponds to road segments of the map data 111 that are listed as having a "two-way" directionality property but that appear to actually be one-way, and further include an "unconnected road" type that corresponds to road segments that cannot be reached from other road segments. In general, different embodiments may have any number of different autocheck types 312.

The autocheck types 312 may be implemented by a designer of the autocheck module 115 as a set of conditions implemented with code in programming languages such as C or C++. If the conditions for a particular autocheck type are true when applied to given portions of the map data 111, then the associated autocheck type 312 is triggered for that portion of the map data.

Each autocheck type 312 may optionally have associated suggested action code for performing a particular action to resolve the anomaly that triggered the autocheck type. For example, the associated suggested action code might assist a human user of an editing client 120 to investigate the anomaly by (for example) displaying satellite imagery associated with the portion of the map data 111 that triggered the autocheck type 312. As another example, the associated suggested action code might alternatively and/or additionally automatically edit the portion of the map data 111 to eliminate the anomaly. In other embodiments, this functionality is instead embodied in the software of the editing clients 120.

The issue database 314 stores a set of issue entries, each issue entry corresponding to an instance of one of the triggered autocheck types in association with the portion of the map data 111 that triggered it. In one embodiment, each issue entry has an identifier of the triggered autocheck type 312, the location of the map data 111 that triggered it, and the data corresponding to that particular autocheck type. Different autocheck types 312 may define their locations in different ways. For example, if the map data that triggers a particular autocheck type 312 is a single segment, the location of the autocheck type might be defined as the segment midpoint; or if the map data that triggers a different autocheck type 312 involves an intersection and two neighboring segments, the location for the autocheck type might be defined as the location of the intersection. Thus, as one example of an issue entry, the issue entry for the mislabeled two-way road described above might have data specifying that the autocheck type is "mislabeled two-way road", and that the autocheck type's location is a particular coordinate pair (corresponding, for example, to the midpoint of the particular road segment having an apparently incorrect directionality property), followed by the data that is relevant to that autocheck type, such as an identifier of the road segment. In one embodiment, the issue database 314 is implemented as a table of a conventional relational database management system.

The trigger logic 310 applies each of the autocheck types 312 to the map data 111 to determine which portions of the map data appear anomalous. In one embodiment, the trigger logic 310 sequentially traverses all of the map data 111 for each autocheck type 312, either in sequence or in parallel. For example, the trigger logic 310 might perform exhaustive traversal of all of the map data 111, testing the associated condition—e.g., that the road element is a road segment, AND the element's directionality property is "two-way", AND GPS readings associated with the element indicate a direction other than the direction indicated by the element's directionality property—against each element of map data. For each portion of map data 111 that triggers one of the autocheck types 312, the trigger logic 310 creates an issue entry in the issue database 314. Thus, a given autocheck type 312 can have multiple associated issue entries in the issue database 314, one issue entry for each distinct portion of the map data 111 that triggers the autocheck type. In one embodiment, the trigger logic 310 creates only one issue entry for a set of autocheck types 312 that are considered equivalent. In one embodiment, autocheck types 312 are considered equivalent if they are of the same type and the portions of map data 111 that triggered them are located within some threshold distance of each other, such as 10 meters. For example, the trigger logic 310 might create a first issue entry for a given autocheck type 312, and thereafter not create a second issue entry for any other autochecks of the same type located within 10 meters.

The resolution logic 320 automatically or semi-automatically investigates and resolves the various issue entries in the issue database 314. In one embodiment, the resolution logic 320 provides a representation of each issue entry in the issue database 314 to at least one of the editing clients 120. The editing clients 120 (possibly via the human operators that user them) then investigate the issue entry and provide a resolution status for it, such as either being correct map data, or incorrect map data that has now been corrected.

In one embodiment, for each issue entry for which a resolution status is provided, the resolution logic 320 then tests the associated autocheck type 312 against the map data 111 (e.g., the particular map data associated with the issue entry) a second time and determines whether the autocheck type's condition still triggers. The resolution logic 320 then takes an action based on both the status provided by a human operator of the editing client 120 and on whether the autocheck type triggers the second time it is tested. If the provided status was that the associated map data was incorrect but has now been corrected, and the autocheck type's condition still triggers, then the resolution logic 320 takes an action corresponding to a mistake by the operator, such as reassigning investigation of the issue entry to a different operator and noting the operator mistake in a log for future performance evaluation or compensation of the operator. If, however, the autocheck type's condition no longer triggers, then the resolution logic 320 takes an action corresponding to a successful correction by the operator, such as marking the issue entry as having been resolved and/or removing it from the issue database 314. This obviates the necessity of having a second human operator investigate the situation and confirm that it has been resolved, thus saving time and effort. If instead the provided status of the issue entry is that the associated map data was in fact correct, then the resolution logic 320 takes an action to check the operator, such as reassigning the issue entry to another operator and checking whether the other operator also considers that the associated map data was in fact correct.

In one embodiment, the actions of the trigger logic 310 and the resolution logic 320 act as operations in a workflow system. That is, identification of triggered autocheck types 312 by the trigger logic 310 and creation of an issue entry in the issue database 314 cause the issue entry to be assigned to one or more human operators, e.g. by pushing it into a queue of issue entries available to the software running on the editing clients 120. When the human operators investigate and provide a status for an issue entry, the issue entry is then placed within a different queue of the resolution logic 320, which then determines an appropriate action to take based on the provided status and on whether the associated autocheck type 312 is triggered a second time.

Autocheck Data Flow

Figure 4:
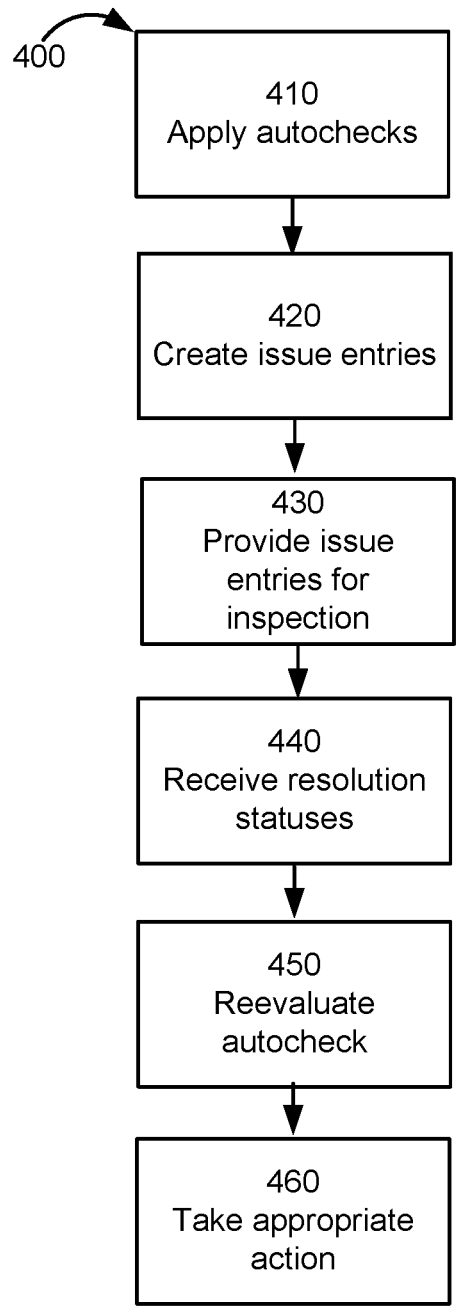
FIG. 4 is a flowchart illustrating a high-level view of steps carried out by the autocheck module of FIG. 3 when applying autocheck types and taking actions based on the autocheck types that were triggered, according to one embodiment.

FIG. 4 is a flowchart illustrating a high-level view of steps carried out by the autocheck module 115 of FIG. 3 when applying autocheck types and taking actions based on the autocheck types that were triggered, according to one embodiment. First, the autocheck module 115 applies 410 the various autocheck types 312 to the map data 111. For each portion of the map data 111 that triggers one of the autocheck types 312, the autocheck module 115 creates 420 an issue entry for that autocheck type and associates the relevant portion of map data with it, and stores the issue entry in the issue database 314. In one embodiment, the autocheck module 115 does not create an issue entry for a particular autocheck type 312 that already has an associated issue entry corresponding to data located within some threshold distance of a new potential issue entry, e.g., 10 meters.

In one embodiment, the autocheck module 115 then provides 430 the issue entries to editing clients 120, e.g., via a workflow system. The editing clients 120, possibly via human operators, analyze the map data 111, optionally make changes to the map data, and provide resolution statuses for some or all of the issue entries, which the autocheck module 115 receives 440. The resolution status could be, for example, that the associated map data was correct (so no change was made), or that the map data was incorrect and has now been corrected. The autocheck module 115 may then, for each issue entry with a provided resolution status, reevaluate 450 the map data using the autocheck type 312 associated with the issue entry and take 460 an appropriate action based on a combination of the provided resolution status and whether or not the associated autocheck type is triggered again.

In some embodiments, the autocheck module 115 automatically addresses the issue entries by analyzing and possibly altering the map data 111, and thus need not perform steps 430-460.

Autocheck Types in Detail

Now that the overall operation of the map system 100 and its autocheck module 115 have been described, various ones of the different autocheck types 312 evaluated by the autocheck module are now described in detail.

Figure 5A:
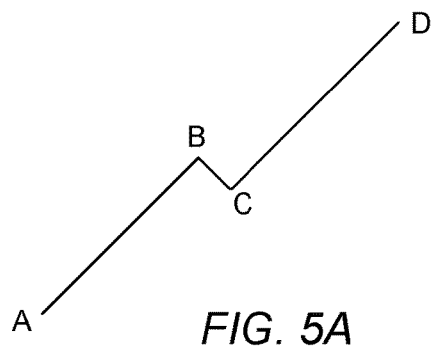
FIGS. 5A, 5B, 5N, 5P, 5Q, 5R, 5E, 5F, 5G, 5H, 5I, 5S, 5T, 5K, 5L, 5U, and 5V illustrate the workings of various autocheck types, according to some embodiments.

Misaligned Road Segments:

The "misaligned road segments" autocheck type detects road segments that are slightly misaligned, constituting a minor "kink" in the road consisting of two sharp turns nearby to each other. For example, in FIG. 5A, the turn ABC between road segments AB and BC is approximately 90°, and the turn BCD between road segments BC and CD is also approximately 90°, for a sum of approximately 180°. In one embodiment, "misaligned road segments" autocheck type is triggered if the sum of any two consecutive turn angles in a path is more than some threshold, such as 170°, and the locations of the turns—that is, the endpoints of the road segments making up the turn—are within some threshold distance of each other, such as 50 meters.

Figure 5B:
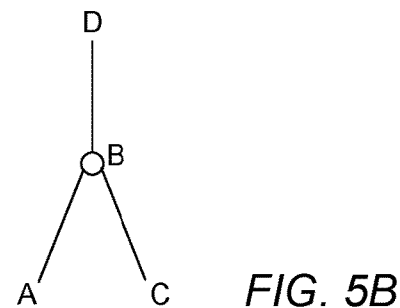

Sharp Turns:

The "sharp turns" autocheck type detects single turns that are unusually sharp, below some threshold angle such as 35°. For example, in FIG. 5B, if the turn from road segment AB to road segment BC via intersection B were 30°, then this turn would be flagged by the autocheck type 312 as meriting further investigation. A human operator of the editing client 120, when investigating the resulting issue entry, might then (for example) view nearby satellite imagery to determine whether there are street signs indicating that such a turn is in fact allowed.

Intersecting Roads-Altitude:

This autocheck type 312 detects roads lacking an intersection that are normally expected to share an intersection, or roads having an intersection that would not normally be expected. For example, road segments at the same planar location, but at a different altitude, are not expected to have an intersection, and road segments at the same planar location and the same altitude and having the same road type are expected to have an intersection. In one embodiment, the altitude is approximated by a road segment grade level, such as an overpass or a tunnel. Road segments are said to have substantially the same altitude if they have altitude within some threshold amount of each other (e.g., 10 feet), or they have the same grade level.

Intersecting Roads—Road Type:

This autocheck type 312 detects roads of different road types having an intersection, such as a paved road sharing an intersection with a ferry line. Since an intersection implies the ability to transition between the road segments, an intersection between road segments of different types is considered anomalous.

Unreachable Clusters:

This autocheck type 312 determines whether one region of the map is reachable from another region having the same road type, e.g., whether one paved road region accessible to a car is reachable from another paved road region. In one embodiment, the map data is first mapped from an intersection-oriented representation (in which each intersection is represented by a node, and roads are represented by one or more segments between the nodes) to a segment-oriented representation (in which each road segment is represented by two nodes, one for each direction that can be traveled along the segment, and an edge between a first and a second node indicates that after traversing the first road segment in the direction corresponding to the node, it is possible to traverse the second road segment in the direction corresponding to the second node). This mapping is performed separately for each of the R road types (e.g., paved, unpaved, railroad, etc.), resulting in R graphs. In the segment-oriented representation, a first node $N_1$ (representing a segment and a direction) is connected to a second node $N_2$ in a given one of the graphs if it is possible to directly reach $N_2$ from $N_1$ via the road type associated with that graph. Then reachability analysis can be performed, the reachability analysis determining which road segments or intersections can be reached from other road segments/intersections (e.g., using on road segments of a particular road type). Based on the results of the reachability analysis, it can be determined whether some clusters are unreachable from other clusters; if so, the autocheck type 312 is triggered, with the location of the associated issue entry being the expected location of a connection.

Figure 5N:
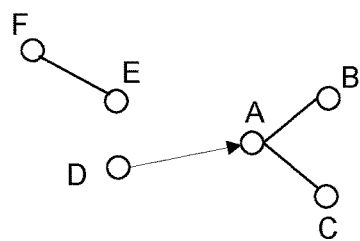
Figure 5P:
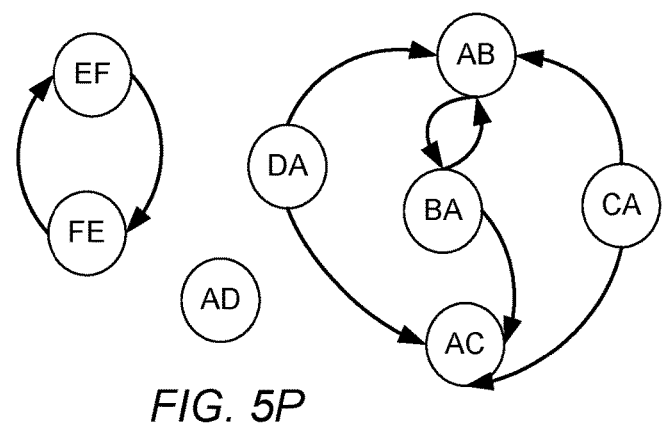
Figure 5Q:
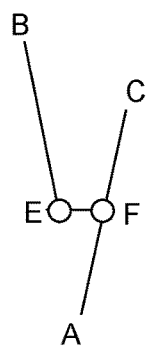

As an example mapping, FIG. 5N depicts a graph of the connections that can be formed via a particular road type (e.g., paved roads). Nodes A through F represent intersections, with the various segments between them representing paths between the intersections that are possible using the road type, with segment DA being one-way from D to A, and the other segments being two way. FIG. 5P represents the above-described segment-oriented representation of the graph of FIG. 5N. Segment EF is represented by a first node EF (representing traveling from E to F) and a second node FE (representing traveling from F to E), for example, and the other nodes of FIG. 5N are similarly represented. The edges between the nodes represent whether it is possible to move from one segment to another given the one-way segments and any turn restrictions in the graph. Assuming no turn restrictions (e.g., U-turns being allowed), there is an edge from segment EF to segment FE, illustrating that after moving along segment EF from intersection E to intersection F, it is possible to traverse segment EF moving from intersection F to intersection E on the next segment move (i.e., by making a U-turn). Similarly, there are edges from segment DA to segments AB and AC, illustrating that after moving from intersection D to intersection A along segment AD, it is possible to next move along segment AB from intersection A to intersection B, or along segment AC from intersection A to intersection C. There is no edge from segment DA to segment AD, since segment DA is one-way from D to A, and hence it is not possible to traverse segment DA from A to D. FIG. 5P assumes that all turns are allowed, but if (in contrast) there were a prohibition of U-turns at intersection C, then there would be no edge from segment AC to CA, since it would not be possible to turn around at intersection C and return to intersection A.

In this example, the cluster comprising nodes EF and FE is not reachable from the cluster comprising nodes DA, AB, BA, AC, and CA, for example. Thus, the "unreachable clusters" autocheck type 312 is triggered and the location is set to the area including nodes E and D in FIG. 5N, since given the physical proximity of nodes E and D it is likely that there should be a connection between those nodes. A human operator of an editing client 120 may then examine nearby satellite imagery, for example, to determine whether a road segment should be added between segments E and D.

Figure 5R:
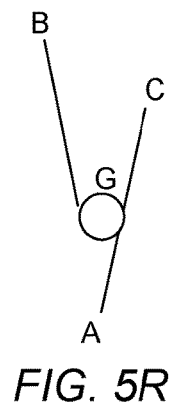

Close Roads:

In some cases, users of the map clients 150 would prefer to have the degree of real-world detail reduced in order for the map data 111 to appear more conceptual and easily-understood. For example, two intersections located very close to each other, such as within 6 meters, can be merged into a single intersection. For example, referring to 5Q, if intersections E and F were located within some predetermined threshold distance of each other (e.g., 6 meters), then they could be merged into a single intersection, such as intersection G depicted in FIG. 5R. Thus, this "close roads" autocheck type determines whether two intersections appear within some predetermined threshold distance of each other, triggering if so.

Figure 5E:
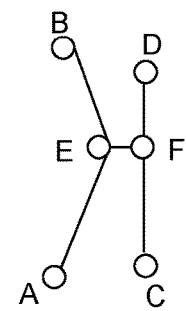

Short Connector Road:

If a connector road segment between two segments is extremely short (e.g., less than 2 meters), it may be more intuitive to users of the map clients 150 to treat the road segment as a single intersection, rather than a road segment. This results in shorter, simpler directions when the path finder module 113 of FIG. 1 provides a path that traverses the segment. Thus, this autocheck type 312 detects short road segments connecting other segments, and its associated suggested action code replaces the detected road segment with a single intersection. For example, in FIG. 5E, the road segment EF, if less than some predetermined distance (e.g., 2 meters), can be replaced by an intersection within the map data 111.

Changing Properties on a Path:

Typically, the properties on a single path tend to be consistent. For example, a single path tends to be all one-way or all two-way for a significant portion of the path. The existence of multiple variations in a property between road segments thus represents an anomaly to be investigated. Specifically, this autocheck type 312 identifies the most significant path or paths through a given road segment or intersection and examines the property consistency on the path. In one embodiment, the most significant path is identified based on the likelihood that all the segments constitute the same road. In one embodiment, a path is considered to have segments that constitute the same road, and thus to constitute the most significant path, if the segments are arranged essentially in a straight line, or if names associated with the segments are the same. Then, the identified path is analyzed with respect to one or more properties of its constituent road segments, such as the directionality (e.g., one-way or two-way), or priority (or priority range, such as local roads and arterial roads), or road name (e.g., "Main Street"), of the segments. Paths with at least some predetermined threshold degree of variation in segment properties trigger the autocheck type. In one embodiment, the threshold degree of variation is more than one property change within 5 contiguous segments on the path.

Access Control:

In practice, certain types of high-priority roads, such as freeways, are entered or exited only via ramps. Thus, it is considered anomalous if a road composed of road segments with the particular high level of priority transitions to road segments of a lesser priority without there being an intervening ramp segment. Specifically, this autocheck type 312 identifies each transition between a road segment having at least some threshold high priority indicating controlled access. If there is an adjacent road segment having priority less than the priority indicating controlled access, and that road segment is not a ramp, then the autocheck type 312 is triggered.

Unmarked Roundabout:

This autocheck type 312 detects groups of road segments that appear to constitute a roundabout, but that are not marked as such, e.g. in their road usage properties. Specifically, the autocheck type 312 is triggered for a road segment of a group of segments if the segments (1) connect to form a cycle, (2) the cycle is shorter than some threshold distance (e.g., 1 kilometer), (3) the sum of the turn angles is within some threshold amount of 360° (e.g., is less than 400°), (4) there are no road segments bisecting the cycle, and (5) the road segment properties do not indicate that the road segment is part of a roundabout. Note that this formulation of (3) allows for roundabouts that are oval in shape, rather than requiring purely circular roundabouts.

Marked Roundabout:

In similar fashion to the autocheck type 312 for an unmarked roundabout, this autocheck type 312 detects road segments that are marked as being roundabouts but that are not connected with other road segments to form a roundabout. That is, the autocheck type 312 for marked roundabouts determines, for each road segment marked as being a roundabout, whether (1) it forms a cycle with other road segments also marked as being roundabouts, (2) the cycle is shorter than some threshold distance, (3) the sum of the turn angles is within some threshold amount of 360°, and (4) there are no road segments bisecting the cycle. If any of (1)-(4) are not the case, then the autocheck type is triggered, since the road segment is not apparently actually part of a roundabout.

Figure 5F:
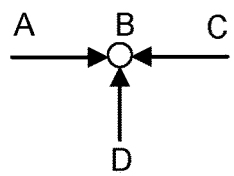

Opposing One-Way Segments:

This autocheck type 312 detects one-way roads directed in opposite directions that arrive at a common intersection. For example, FIG. 5F depicts one-way road segments AB and CB, both directed towards a common intersection B, a scenario that is unlikely to occur in reality. Specifically, the autocheck type 312 is triggered if (1) two road segments are one-way, (2) the segments are directed toward a common intersection, and (3) the roads are essentially parallel. Thus, for example, segments AB and CB in FIG. 5F would trigger this autocheck type 312, but segments AB and DB would not, since those segments are not essentially parallel.

Figure 5G:
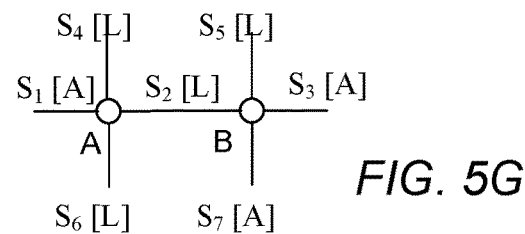
Figure 5H:
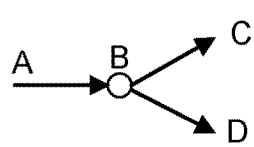

Priority Dead-Ends:

In general, road systems are designed so that at most intersections there is the option of continuing on a road segment of at least as great a priority as the current road segment, at least for the case of relatively high priority road segments. For example, when arriving at an intersection on a freeway (e.g., a split into several freeways and/or an off-ramp), it should generally be possible to continue on a freeway, rather than being forced to transition to a road segment of lesser priority. Thus, this autocheck type 312 determines, for an intersection, and for each road segment that enters the intersection and that has at least some threshold priority, that there is another road segment exiting that intersection having at least as high a priority as that of the entering segment. If not, the autocheck type 312 is triggered. For example, in FIG. 5G, the autocheck type 312 would be triggered by road segment $S_1$ at intersection A, since it has a relatively high arterial road priority (as indicated in FIG. 5G by the associated letter 'A'), but all of the segments exiting intersection A have a lower local road priority (as indicated by the associated letter Ramp/Non-Ramp Fork:

In real-world traffic systems, a ramp off of a freeway typically forks, if at all, only into other ramps. For example, in FIG. 5H assume that one-way road segment AB is a ramp. If either of the one-way road segments BC or BD are not ramps, then this autocheck type 312 is triggered.

Ramp/Non-Ramp Merge:

In real-world traffic systems, if two road segments merge into a ramp, the two road segments are typically also ramps. Thus, this autocheck type is triggered where either a one-way road leading out of an intersection is a ramp, and at least one of two one-way roads leading into the intersection is not a ramp.

Ramp Connection to Priority:

In real-world traffic systems, a ramp that forks should lead to freeway or other high-priority road. Thus, this autocheck type 312 detects ramp road segments that lead to an intersection at which two or more other road segments join, where none of the other road segments have at least some threshold level of priority. For example, in FIG. 5H, if AB is a ramp, and neither BC nor BD have at least the priority of arterial roads such as highways or freeways, then the autocheck is triggered.

Ramp Priority Connect:

In certain situations, such as a when showing a zoomed-out version of a map that includes only freeways or other major arterial roads, many map applications will not display roads below a certain priority level. In these situations, any ramps leading to or from road segments of lower priority levels should likewise be excluded for the sake of consistency. Thus, this autocheck is triggered by ramp road segments that have a higher priority level than one of the road segments to which they connect.

Short Segment:

Certain road segments typically have a segment length of at least some expected distance. For example, road segments with high priority levels such as freeways typically are at least 1 kilometer in length. Thus, this autocheck is triggered for segments lacking at least some expected length, and the expected length need not be fixed for all road segments, but rather may be a function of one or more of the segment properties, such as the segment priority.

Figure 5I:
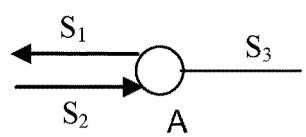

Split Roads:

A split road, such as a two-way road divided by a physical barrier, may be modeled as two logical roads, each being one-way and corresponding to one direction of the split road. For example, FIG. 5I depicts a split road, modeled as first one-way road segment $S_1$ and a parallel second one-way road segment $S_2$ traveling in the opposite direction, and merging at an intersection A into a single two-way road segment $S_3$. Split roads typically have certain behavior, such as allowing U-turns at intersections. Thus, this autocheck type 312 detects whether a particular set of road elements constitutes a split road, and if so, whether the U-turn restrictions at the logical portion of the split road that heads toward the intersection are what is expected. In one embodiment, a set of road elements is considered to constitute a split road if there is an intersection with a two-way road segment and two one-way segments directed in opposite directions, with the angle between the two one-way segments being at most 120°, and the angle between each one-way segment and the two-way segment being at least 90°. If the autocheck triggers, a human operator might, for example, examine associate satellite imagery to look for the presence or absence of U-turn signs.

Discontinued One-Way:

Road segments bordering on a road segment with one-way directionality are frequently themselves one-way segments. This autocheck type 312 thus is triggered by a segment that is a neighbor of a one-way segment (i.e., that is separated from the one-way segment by at most one intersection) and that is not itself a one-way segment. Note that this autocheck may have a high false-positive rate, but that this rate is acceptable in many circumstances, given the importance of identifying erroneous one-way designations (or lack thereof).

Isolated Segments:

In general, every road segment should be able to reach some other road segment. Similarly, every road segment should be able to be reached by some other road segment. Thus, the "isolated segments" autocheck type 312 determines whether there are segments for which either of these properties does not hold, resulting in an issue entry for each such segment. In one embodiment, the map data 111 is first mapped to a segment-oriented representation, as discussed above with respect to the "unreachable cluster" autocheck type. Then, for each segment, the "isolated segments" autocheck type 312 determines whether there are "factory" segments for which there is no edge leading in, or "graveyard" segments for which there is no edge leading out.

Figure 5S:
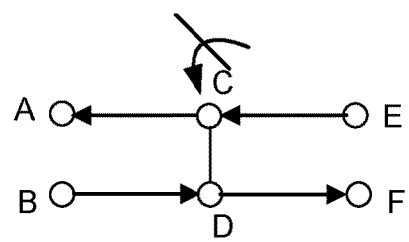
Figure 5T:
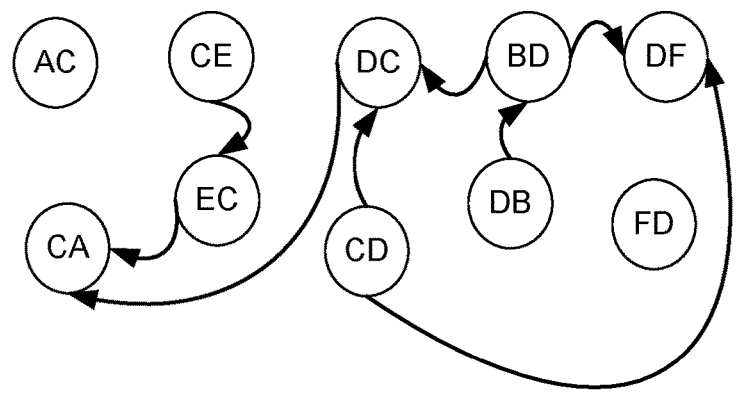

For example, FIG. 5S depicts a set of segments between intersections A-F, where EC and CA are one-way segments in a first direction, and BD and DF are one-way segments in a different direction, and where no left turn is allowed at C when coming from E, and no U-turn is allowed at C when coming from D. FIG. 5T then represents the segment-oriented representation of FIG. 5S. Segment CD is a "factory" segment in that no edge leads into it, thus representing that it is not possible to travel along it. Likewise, segment DF is a "graveyard" segment in that no edge leads out of it, thus representing that there is nowhere else to go once one has travelled along it.

Signs:

Some types of road segments, such as freeways or highways, often have signs associated with one of their directions of travel that indicate that that direction leads to a particular destination within a particular distance. For example, a sign might state "To Main Street", or "Towards Sacramento: 75 miles." Such signs can afford useful indications of whether the map data 111 is correct. A first autocheck type 312 associated with signs determines whether a destination road occurs within some threshold distance of the sign (e.g., 1 kilometer) by testing all or some paths within the threshold distance and determining whether any of them lead to a road segment with a name matching that on the sign. For example, in the case of a sign "To Main Street", the autocheck type might determine whether any of the paths starting at the sign and running less than 1 kilometer arrive at a road segment with the name "Main Street" (or a well-known equivalent, such as "Main St."). If not, the autocheck is triggered.

Figure 5K:
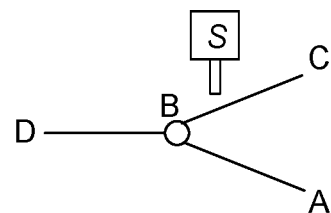

A second autocheck type 312 associated with signs determines whether a segment is on a path suggested by the path finder module 113 of FIG. 1 to a city or other distant location listed on the sign. For example, FIG. 5K depicts A sign S along road segment BC, applicable to traffic along the path from B to C. Assume that S states "Towards Sacramento: 75 miles", indicating that segment BC is on the route from B to the city of Sacramento, and that the approximate distance to Sacramento along an efficient route is 75 miles. The path finder module 113 is then applied to find a route from the location of the sign to the destination listed on the sign (e.g., the city of Sacramento). If the path calculated by the path finder module 113 does not have a length within some threshold tolerance of that reported on the sign (e.g., within 3 miles of the reported 75 miles), then the second autocheck type 312 is triggered. A human operator of an editing client 120 of FIG. 1 can investigate the cause of the triggering of the autocheck type 312, such as inaccurate intersection data leading to an incorrect route being calculated.

Name/Property Correlations:

The name of a road segment often provides significant clues about the segment's priority level. For example, the name "I-N", for some number N, (e.g. "I-80"), indicates that the road segment is an interstate freeway, and thus has a particular high priority level, and "State Route N" indicates a state route with relatively high priority. As a more particular example, assuming possible priority levels ranging from 1 (lowest) to 9 (highest), "I-N" might indicate priority level 9, "US-N" a priority of 7, 8, or 9, "State {Route|Road} N" a priority from 5 to 9, and so forth. Thus, a first name/property autocheck type 312 might be triggered for a given road segment if the priority level associated with a segment fails to match the priority or priority range associated the segment's name. Similarly, a second name/property autocheck type 312 might be triggered for a given road segment if the speed limit associated with the segment fails to match the speed limit or speed limit range associated with the segment's name, or with the segment's priority level. Likewise, a third name/property autocheck type 312 might be triggered for a given road segment if the segment has a name on a list of names expected to correspond to unpaved roads (e.g., "Fire Road N") and the segment's road type property is something other than "unpaved road."

Address Discrepancies Across Data Sets:

The map data 111 may be improperly modified when operators of the map system 100 update it, or (more generally) the map data may have inconsistencies with respect to some other set of map data, whether an older version of the same map data, or a map data set from an entirely different source. One of the properties that may vary between the current map data 111 and another map data set representing the same locations is the presence or absence of a general address name (e.g., a street name, such as "Main Street") or a particular address range (e.g., 100-150 Main Street). Thus, an autocheck type 312 oriented towards this potential discrepancy detects, for road segments in the map data 111, whether a road segment at the same location in another map data set has associated address names or address ranges that differ from the segment in the map data 111, triggering if so.

Figure 5L:
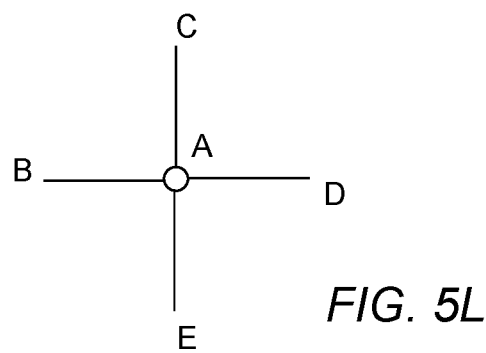

Address Discrepancies Across Intersections:

Address properties, such as numerical address sequence, and whether odd or even addresses are on the left or right side of the street, are generally expected to remain consistent across intersections for the same road. For example, in FIG. 5L, if segments AB and AD both have the associated name property "Main Street", then they are assumed to represent the same road; alternatively, if segments AB and AE have the same name, they would also be assumed to represent the same road. Assuming for the sake of example that segments AB and AD have the same name (and thus are assumed to represent the same road), and assuming that segment AB has associated addresses 100-251, with lower addresses on the side farther from intersection A, then segment AD is expected to have addresses starting around 252 and increasing along with distance from the intersection. Similarly, if segment AB had odd-numbered addresses on its left side when traveling in a particular direction, then segment AD is likewise expected to have odd-numbered addresses on its left side when continuing to travel in that same direction.

Path Finder Calculations

The above-described autocheck types 312 typically examine all map data 111. In order to focus on more important routes, rather than routes that are merely theoretically possible, the path finder module 113 can be employed to calculate paths between two given locations, and perform checks only on the resulting actual paths. Since these paths represent routes that someone would likely actually travel if going from the given source to the given destination, these paths are particularly valuable to analyze. In one embodiment, the paths that are tested are between locations taken from logs of prior routes requested by users. In order to achieve some variation from the exact <source, destination> pairs specified by prior users, the sources and destinations may each be taken from different prior queries, rather from the same query, and/or may additionally be randomly selected from the map data 111. Each of these routes may then be evaluated using the autocheck types 312 described below. Additionally, certain ones of the autocheck types 312 described above may be applied to such routes, thereby limiting the amount of data that must be examined. For example, the autocheck types 312 for detecting sharp turns or changing properties on a path may be limited only to paths calculated by the path finder module, rather than being applied to a large number of theoretically possible paths from all locations in the map data 111. The following are some autocheck types 312 that operate on paths calculated by the path finder module 113.

Figure 5U:
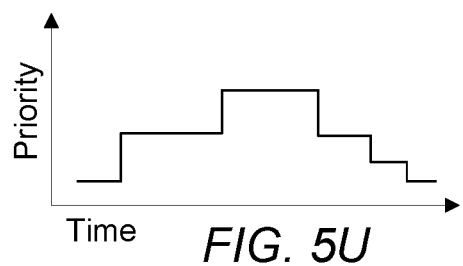
Figure 5V:
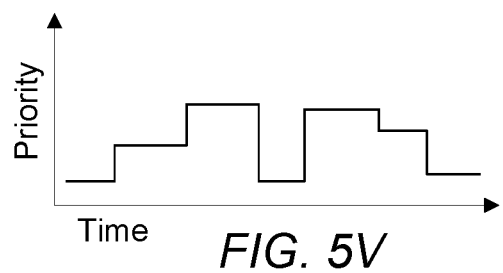

Priority Ladder:

On a typical route, the priority levels of the road segments traversed from the source location to the destination location follow an expected pattern, beginning relatively low (e.g., city streets) at the source (e.g., a person's home in a residential area), rising (e.g., up to faster, higher priority arterial roads such as freeways), and then falling again as the destination is reached (e.g., exiting the freeway and entering city streets to get to a store destination). This typical situation is represented by the diagram of FIG. 5U. Thus, if a route deviates from this general pattern, such as falling in priority level towards the middle of the trip and then rising again before falling near the destination, as depicted in FIG. 5V, then the autocheck type 312 for the priority ladder is triggered. In one embodiment, the autocheck type is triggered for a path whenever the priority levels rise again after once starting to fall. In another embodiment, the autocheck type is triggered only if an individual fall and rise represents at least a threshold degree of change; for example, in one embodiment, a fall from freeway priority (priority level 9) to arterial priority (priority level 7) back to a freeway does not trigger the autocheck type, but a fall from a freeway to a local road and back up to a freeway, or a fall from an arterial road to a toll road (priority level 1) and back to an arterial road does trigger the autocheck type.

U-Turn not Near Destination:

U-turns are typically not necessary on a route except perhaps near the destination, e.g., to turn around to park on the same side of the street as the destination. Thus, this autocheck type 312 examines a path produced by the path finder module 113 and identifies any U-turns that are part of the path. If the U-turn is not within some threshold distance of the destination location—e.g., 0.5 kilometers, or one road segment—then the autocheck type 312 is triggered.

Path Radius/Priority Comparisons:

As noted, in one embodiment road segments have a path radius property that provides a measure of an average trip distance for which a segment is typically used. (The path radius for a given road segment may be determined, for example, by examining the lengths of paths calculated for prior user queries for paths from sources to destinations, for paths that include the road segment in question.) Generally, high priority segments, such as freeways, tend to be used for long trips, and low priority segments, such as city streets, tend to be used for shorter trips. Thus, this autocheck type compares, for the various road segments in the map data 111, the segment's path radius to the segment's priority, triggering if there is a sufficiently large mismatch between them. In one embodiment, there is an expected minimum path radius associated with each priority, and the autocheck type 312 thus triggers for any road segment having less than the minimum path radius for its priority.

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for the purpose of example, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of identifying anomalous conditions in a database of map data, the method comprising:

storing, by a computing system comprising one or more processors, a set of distinct autocheck types, each autocheck type associated with a category of anomalous condition and indicating, when associated with a portion of map data, whether the associated category of anomalous condition is present within the portion, wherein the set of distinct autocheck types comprises a name-property correlation autocheck type;

automatically associating, by the computing system, a plurality of the stored autocheck types to the database of map data, wherein automatically associating the plurality of the stored autocheck types to the database of map data comprises:

identifying, by the computing system, in the portion of the map data, a road segment, a name of the road segment, and a property value of the road segment;

determining, by the computing system, that an anomalous condition is present in the portion of the map data, responsive to the identified property not corresponding to an expected property value of the identified name of the road segment;

for each applied autocheck type, and for portions of the map data for which the autocheck type indicates that the associated category of anomalous condition is present, determining, by the computing system, based on logs of prior routes requested by users, a plurality of routes between source locations and destination locations associated with a subset of the portion of the map data;

responsive to confirming that the anomalous condition is present, creating, by the computing system, an issue entry associated with the subset of the portion of the map data within which the associated anomalous condition is present; and displaying, by the computing system, imagery comprising the portion of the map data for which the autocheck type indicates that the associated category of anomalous condition is present.

2. The computer-implemented method of claim 1, wherein the set of distinct autocheck types comprises a misaligned road segments autocheck type, and wherein applying the misaligned road segments autocheck type comprises:

identifying, by the computing system, in the portion of the map data, two consecutive turns defined by road segments within the portion of map data, the turns being within some threshold distance of each other;

determining, by the computing system, an angle of the first turn and an angle of the second turn; and determining, by the computing system, that an anomalous condition is present in the portion of the map data, responsive to a sum of the angles being within some threshold number of degrees from 180 degrees.

3. The computer-implemented method of claim 1, wherein the set of distinct autocheck types comprises an intersecting roads autocheck type, and wherein applying the intersecting roads autocheck type comprises:

identifying, by the computing system, in the portion of the map data, one of an unexpected presence of an intersection between a first road segment and a second road segment and an unexpected absence of an intersection between the first road segment and the second road segment, the identification performed based on altitudes of the first and second road segments indicated by the map data.

4. The computer-implemented method of claim 3, wherein identifying an unexpected presence of the intersection comprises:

identifying, by the computing system, an intersection between the first road segment and the second road segment in the portion of the map data;

determining, by the computing system, that an anomalous condition is present in the portion of the map data, responsive to determining that an altitude of the first road segment and an altitude of the second road segment are not substantially the same.

5. The computer-implemented method of claim 3, wherein identifying an unexpected absence of the intersection comprises:

identifying, by the computing system, a lack of an intersection between a first road segment and a second road segment in the portion of the map data;

determining, by the computing system, that an anomalous condition is present in the portion of the map data, responsive to determining that an altitude of the first road segment and an altitude of the second road segment are substantially the same.

6. The computer-implemented method of claim 1, wherein the set of distinct autocheck types comprises an intersecting roads autocheck type, and wherein applying the intersecting roads autocheck type comprises:

identifying, by the computing system, an intersection between a first road segment and a second road segment in the portion of the map data; and determining, by the computing system, that an anomalous condition is present in the portion of the map data, responsive to a road type of the first road segment differing from a road type of the second road segment.

7. The computer-implemented method of claim 1, wherein the set of distinct autocheck types comprises an unreachable clusters autocheck type, and wherein applying the unreachable clusters autocheck type comprises:

obtaining, by the computing system, intersection-oriented map data from the portion of the map data in the database, wherein the intersection-oriented map data comprises nodes corresponding to intersections and edges between the nodes corresponding to road segments between the intersections, each road segment having a first end and a second end;

mapping, by the computing system, the intersection-oriented map data to segment-oriented map data, wherein the segment-oriented map data comprises pairs of nodes, each pair of nodes corresponding to one of the road segments, a first node of a pair representing traversal of the corresponding road segment from the first end of the road segment to the second end of the road segment, and a second node of the pair representing traversal of the corresponding road segment from the second end of the road segment to the first end of the road segment;

performing, by the computing system, a reachability analysis within a graph formed by the segment-oriented map data, the reachability analysis determining based on the map data which road segments a traveler can reach from which other road segments;

identifying, by the computing system, a first road segment of the segment-oriented map data from which it is expected that a traveler could reach a second road segment of the segment-oriented map data; and determining, by the computing system, that an anomalous condition is present in the portion of the map data, responsive to the reachability analysis indicating that a traveler cannot reach the second road segment from the first road segment.

8. The computer-implemented method of claim 7, wherein identifying the first road segment from which it is expected that a traveler could reach a second road segment comprises determining that the first road segment is less than some threshold distance from the second road segment.

9. The computer-implemented method of claim 7, further comprising performing the reachability analysis separately for each of a plurality of different road types.

10. The computer-implemented method of claim 1, wherein the set of distinct autocheck types comprises a changing properties autocheck type, and wherein applying the changing properties autocheck type comprises:

identifying, by the computing system, in the portion of the map data, a path comprising a set of adjacent road segments; and determining, by the computing system, that an anomalous condition is present in the portion of the map data, responsive to detecting at least a threshold degree of variation across segments of a property of the road segments in the path.

11. The computer-implemented method of claim 10, wherein the property is one of segment name, segment directionality, and segment priority level.

12. The computer-implemented method of claim 1, wherein the set of distinct autocheck types comprises an access control autocheck type, and wherein applying the access control autocheck type comprises:
   identifying, by the computing system, in the portion of the map data, a transition between a first road segment having a first priority level indicating controlled access and a second road segment adjacent to the first road segment and having a second priority level indicating a lack of controlled access;
   determining, by the computing system, whether the second road segment corresponds to a ramp; and
   determining, by the computing system, that an anomalous condition is present in the portion of the map data, responsive to determining that the second road segment does not correspond to a ramp.

13. The computer-implemented method of claim 1, wherein the set of distinct autocheck types comprises an access control autocheck type, and wherein applying the access control autocheck type comprises:
   identifying, by the computing system, in the portion of the map data, a set of road segments that connect to form a cycle; and
   determining, by the computing system, that an anomalous condition is present in the portion of the map data, responsive to:
      the cycle having less than some threshold length;
      a sum of turn angles between the road segments in the cycle being less than some threshold amount; and
      the road segments in the cycle not being listed in the map data as being part of a roundabout.

14. The computer-implemented method of claim 1, wherein the set of distinct autocheck types comprises an opposing one-way segments autocheck type, and wherein applying the opposing one-way segments autocheck type comprises:
   identifying, by the computing system, in the portion of the map data, a first one-way road segment and a second one-way road segment that are directed in opposite directions and that terminate at a common intersection; and
   determining, by the computing system, that an anomalous condition is present in the portion of the map data, responsive to the first one-way road segment and the segment one-way road segment being substantially parallel.

15. The computer-implemented method of claim 1, wherein the set of distinct autocheck types comprises a priority dead-end autocheck type, and wherein applying the priority dead-end autocheck type comprises:
   identifying, by the computing system, in the portion of the map data, an intersection, each road segment that enters the intersection, and a priority level of each of the road segments; and
   determining, by the computing system, that an anomalous condition is present in the portion of the map data, responsive to a first one of the road segments lacking a corresponding second one of the road segments having at least as high a priority level as the first road segment.

16. The computer-implemented method of claim 1, wherein the set of distinct autocheck types comprises a ramp fork autocheck type, and wherein applying the ramp fork autocheck type comprises:
   identifying, by the computing system, in the portion of the map data, a one-way ramp road segment that forks into two one-way road segments; and
   determining, by the computing system, that an anomalous condition is present in the portion of the map data, responsive to either of the two one-way road segments not being a ramp.

17. The computer-implemented method of claim 1, wherein the set of distinct autocheck types comprises a ramp connection autocheck type, and wherein applying the ramp connection autocheck type comprises:
   identifying, by the computing system, in the portion of the map data, a one-way ramp road segment that forks into two one-way road segments; and
   determining, by the computing system, that an anomalous condition is present in the portion of the map data, responsive to neither of the two one-way road segments having a priority level corresponding to an arterial road.

18. The computer-implemented method of claim 1, wherein the set of distinct autocheck types comprises a short segment autocheck type, and wherein applying the short segment autocheck type comprises:
   identifying, by the computing system, in the portion of the map data, a road segment and a corresponding priority level of the road segment; and
   determining, by the computing system, that an anomalous condition is present in the portion of the map data, responsive to the road segment having a length shorter than a length expected of the corresponding priority level.

19. The computer-implemented method of claim 1, wherein the set of distinct autocheck types comprises a split roads autocheck type, and wherein applying the split roads autocheck type comprises:
   identifying, by the computing system, in the portion of the map data, two one-way road segments constituting a split road, the identifying comprising:
      identifying, by the computing system, an intersection such that:
         one of the two one-way road segments terminates at the intersection,
         the other of the two one-way road segments originates at the intersection, and
         a two-way road segment joins the intersection;
      determining, by the computing system, that an angle between the two one-way road segments is less than a first threshold degree; and
      determining, by the computing system, that an angle between the two-way road segment and each of the two one-way road segments is greater than a second threshold degree;
   identifying, by the computing system, in the portion of map data, whether U-turns are permitted at the intersection; and
   determining, by the computing system, that an anomalous condition is present in the portion of the map data, responsive to U-turns not being permitted at the intersection.

20. The computer-implemented method of claim 1, wherein the set of distinct autocheck types comprises a discontinued one-way autocheck type, and wherein applying the discontinued one-way autocheck type comprises:

identifying, by the computing system, in the portion of the map data, a first road segment and a second road segment that neighbors the first road segment; and determining, by the computing system, that an anomalous condition is present in the portion of the map data, responsive to the first road segment being one-way and the second road segment not being one-way.

21. The computer-implemented method of claim 1, wherein the set of distinct autocheck types comprises an unreachable clusters autocheck type, and wherein applying the unreachable clusters autocheck type comprises:

obtaining, by the computing system, intersection-oriented map data from the map data in the database, wherein the intersection-oriented map data comprises nodes corresponding to intersections and edges between the nodes corresponding to road segments between the intersections, each road segment having a first end and a second end;

mapping, by the computing system, the intersection-oriented map data to segment-oriented map data, wherein the segment-oriented map data comprises pairs of nodes, each pair of nodes corresponding to one of the road segments, a first node of a pair representing traversal of the corresponding road segment from the first end of the road segment to the second end of the road segment, and a second node of the pair representing traversal of the corresponding road segment from the second end of the road segment to the first end of the road segment;

performing, by the computing system, reachability analysis within a graph formed by the segment-oriented map data, the reachability analysis determining based on the map data which road segments a traveler can reach from which other road segments;

determining, by the computing system, that an anomalous condition is present in the map data, responsive to the reachability analysis indicating either that there is a road segment that cannot be reached from any other road segment, or that there is a road segment that cannot reach any other road segment.

22. The computer-implemented method of claim 1, wherein the identified property value is a priority level of the road segment, the method further comprising:

mapping, by the computing system, the identified name to a class associated with one or more priority levels; and determining, by the computing system, that an anomalous condition is present in the portion of the map data, responsive to the identified priority level not corresponding to any of the priority levels associated with the class.

23. The computer-implemented method of claim 1, wherein the set of distinct autocheck types comprises an intersection address discrepancy autocheck type, and wherein applying the intersection address discrepancy autocheck type comprises:

identifying, by the computing system, in the portion of the map data, an intersection, a first road segment that joins the intersection, and second road segment that joins the intersection and that has a same name as the first road segment; and determining, by the computing system, that an anomalous condition is present in the portion of the map data, responsive to at least one of:

address numbers failing to increase in a consistent direction across the first road segment and the second road segment, and odd-numbered addresses appearing on one side of the first road segment and on a different side of the second road segment.

24. A computing system comprising:

one or more processors;

one or more non-transitory computer-readable media storing instructions that when executed by the one or more processors cause the one or more processors to perform operations comprising:

storing a set of distinct autocheck types, each autocheck type associated with a category of anomalous condition and indicating, when associated with a portion of map data, whether the associated category of anomalous condition is present within the portion, wherein the set of distinct autocheck types comprises a name-property correlation autocheck type;

automatically associating a plurality of the stored autocheck types to the database of map data, wherein automatically associating the plurality of the stored autocheck types to the database of map data comprises:

identifying in the portion of the map data, a road segment, a name of the road segment, and a property value of the road segment;

determining that an anomalous condition is present in the portion of the map data, responsive to the identified property not corresponding to an expected property value of the identified name of the road segment;

for each applied autocheck type, and for portions of the map data for which the autocheck type indicates that the associated category of anomalous condition is present, determining, based on logs of prior routes requested by users, a plurality of routes between source locations and destination locations associated with a subset of the portion of the map data;

responsive to confirming that the anomalous condition is present, creating an issue entry associated with the subset of the portion of the map data within which the associated anomalous condition is present; and displaying imagery comprising the portion of the map data for which the autocheck type indicates that the associated category of anomalous condition is present.

25. One or more tangible, non-transitory computer-readable media storing computer-readable instructions that when executed by one or more processors cause the one or more processors to perform operations, the operations comprising:

storing a set of distinct autocheck types, each autocheck type associated with a category of anomalous condition and indicating, when associated with a portion of map data, whether the associated category of anomalous condition is present within the portion, wherein the set of distinct autocheck types comprises a name-property correlation autocheck type;

automatically associating a plurality of the stored autocheck types to the database of map data, wherein automatically associating the plurality of the stored autocheck types to the database of map data comprises:

identifying in the portion of the map data, a road segment, a name of the road segment, and a property value of the road segment;

determining that an anomalous condition is present in the portion of the map data, responsive to the identified property not corresponding to an expected property value of the identified name of the road segment;

for each applied autocheck type, and for portions of the map data for which the autocheck type indicates that the associated category of anomalous condition is present, determining, based on logs of prior routes requested by users, a plurality of routes between source locations and destination locations associated with a subset of the portion of the map data;

responsive to confirming that the anomalous condition is present, creating an issue entry associated with the subset of the portion of the map data within which the associated anomalous condition is present; and displaying imagery comprising the portion of the map data for which the autocheck type indicates that the associated category of anomalous condition is present.

\* \* \* \* \*